Patented Feb. 14, 1939

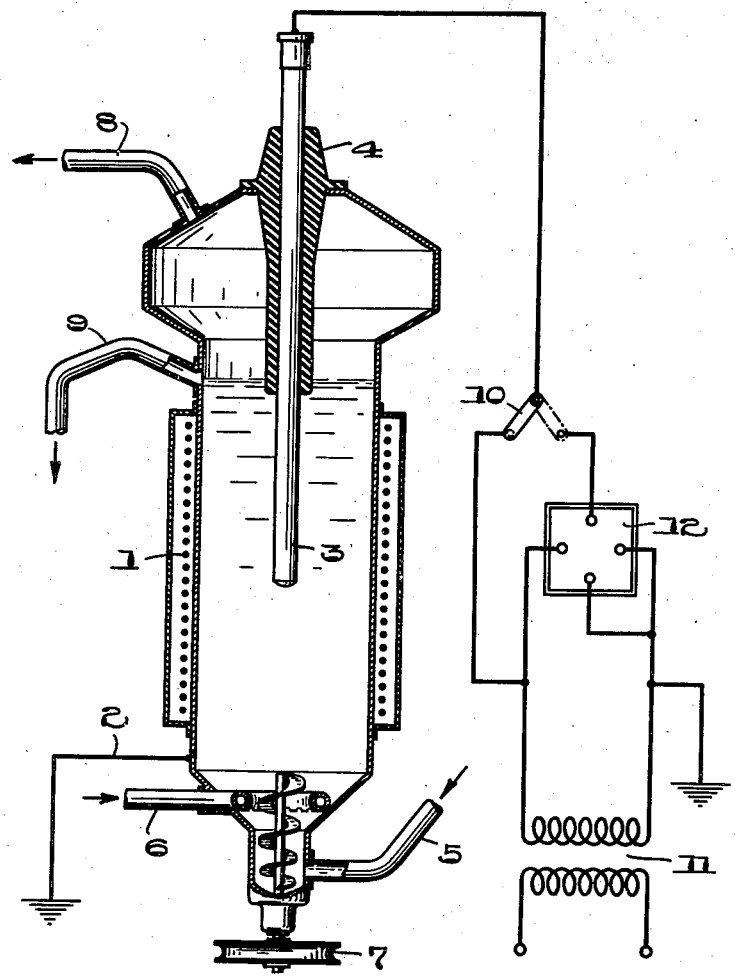

2,147,177

UNITED STATES PATENT OFFICE 2,147,177

METHOD OF HYDROGENATION OF FATTY ACID GLYCERIDES

Iwao Seto and Masanori Sato, Dairen, Manchukuo, assignors to Minami Manshu Tetsudo Kabushiki Kaisha (South Manchuria Railway Co.), Dairen, Manchukuo, a corporation of Japan Application February 26, 1935, Serial No. 8,408

2 Claims. (Cl. 204—31)

The present invention relates to a method of effecting continuous hydrogenation and other catalytic reactions, characterized by the fact that when hydrogenation and other catalytic reactions are performed by employing a catalyzer in suspension for oils, fats and other organic compounds, an electrode is provided in a reaction chamber, so that reaction may be carried out, applying high tension alternating current to said electrode during hydrogenation and that immediately upon the completion of the reaction the alternating current is changed to direct current, whereby the catalyzer is accumulated on the wall of the chamber, in the meantime withdrawing the reaction product alone from the vessel and then giving a fresh supply of the material to the chamber to renew the reaction. The object of this invention is to obtain a continuously hydrogenating method which by the suitable alternate employment of alternating and direct currents does not only accelerate the speed of reaction, but also enables the same catalyzer to be employed repeatedly without impairing its function.

The accompanying drawing shows diagrammatically an example of an apparatus in a longitudinal section for carrying the present invention into practice.

It is well known in the hydrogenation of oils, fats and other organic compounds to previously activate hydrogen by applying high tension current or to carry out reaction directly in a high tension electric field. However, all these known methods do no more than attempt to effect reaction chiefly by electric power.

Now, this invention unlike the methods hitherto proposed employs electric power merely in a subsidiary manner. In electro-catalytic reaction by which the hydrogenation of organic material is effected, there is employed the same reaction temperature and uses the same quantity of a catalyzer and the same other conditions as in ordinary catalytic reaction. In addition to the ordinary catalytic reaction, the present invention embodies the activation of the hydrogen gas introduced into a reaction chamber provided with an electrode, so that during hydrogenation high tension alternating current (the tension being so high as to produce coronal discharge) may be applied. At the same time, by the discharge of electricity the stirring action in the reaction chamber is made uniform and perfect. Thus, it is not only possible to obtain very high reaction speed as compared with the known catalytic reaction, but after the completion of the reaction, the catalyzer is being very easily accumulated on the wall of the chamber by changing the current to direct current, the reaction product alone being discharged from the vessel, after which a fresh supply of raw material is delivered to the vessel and the current is changed again to alternating current, and thus employing the same catalyzer repeatedly. Therefore, quite unlike known methods in which in order to restore its function the catalyzer is necessarily removed from the chamber every time the reaction is completed, is separated from reactive material by filtration and then is recovered by complicated chemical operation, the catalyzer is allowed to stay in the chamber, where it is separated electrically by simple means and is used for fresh material. Accordingly, by simply carrying out the two operations alternately using a certain quantity of a catalyzer, it is possible to effect hydrogenation intermittently. Consequently, the consumption of a catalyzer for any particular material is considerably reduced and yet the operation is greatly simplified.

The following is the manner of performing this invention:—

One electrode is formed by the wall of a cylindrical reaction vessel 2 which is grounded and is surrounded by a heating device 1 and a second electrode 3 is provided at the center of said vessel, the electrodes being insulated from each other by an insulator 4. The vessel 2 is provided at its bottom with an inlet pipe 5 for reactive material, an inlet pipe 6 for hydrogen and a stirrer 7, and at the upper portion with an outlet pipe 8 for hydrogen and an outlet pipe 9 for the reaction product. A source of electricity is connected with the electrode 3 through a switch 10, a transformer 11 and a rectifier 12. A more satisfactory result may be obtained if the surface of the electrode 3 is coated with a thin smooth layer of a dielectric resistance material such as porcelain, enamel, or glass.

In operation, the above reaction chamber is charged with reactive material mixed with a desired quantity of a catalyzer. Controlling properly the temperature, the voltage of current and the introduction of hydrogen and rotating the stirrer 7 to prevent the catalyzer from being deposited on the bottom of the chamber, catalytic hydrogenating reaction is started, utilizing the discharge of high tension alternate current till the reactive material undergoes the desired hydrogenation, when the switch 10 is turned to give direct electric current by the rectifier 12, so that the electrode 3 may be caused to act as an anode. Then, the catalyzer suspending in the reaction zone will be accumulated on the electrode immediately. If now a suitable quantity of fresh reactive material is introduced from the inlet 5, it will raise the level of the liquid in the chamber and discharge the reaction product at the upper part from the chamber through the outlet 9. Then, changing from direct current to alternating current, hydrogenating reaction is again carried out, after which the current is again changed to direct current as before and the reaction product is taken out. In this way, using the same catalyzer repeatedly, it is possible to obtain the reaction product without introducing new or reactivated catalyzer.

As a practicable example, when the same catalyzer was employed repeatedly thirty eight times, the iodine value of the hydrogenated oil in each time was.

| Time | Iodine value |
| --- | --- |
| 1 | 59.4 |
| 2 | 38.3 |
| 3 | 35.0 |
| 4 | 35.6 |
| 5 | 29.1 |
| 6 | 29.5 |
| 7 | 32.5 |
| 8 | 40.5 |
| 9 | 39.7 |
| 10 | 41.3 |
| 11 | 39.1 |
| 12 | 37.4 |
| 13 | 40.5 |
| 14 | 42.6 |
| 15 | 45.5 |
| 16 | 55.7 |
| 17 | 62.6 |
| 18 | 55.6 |
| 19 | 46.0 |
| 20 | 62.3 |
| 21 | 67.6 |
| 22 | 67.1 |
| 23 | 62.8 |
| 24 | 58.4 |
| 25 | 57.6 |
| 26 | 62.8 |
| 27 | 61.8 |
| 28 | 66.2 |
| 29 | 70.7 |
| 30 | 73.7 |
| 31 | 76.0 |
| 32 | 68.5 |
| 33 | 77.3 |
| 34 | 77.5 |
| 35 | 75.8 |
| 36 | 78.0 |
| 37 | 79.6 |
| 38 | 95.3 |

The conditions of operation are the same at all times, and the example shows the degree of the lowering of the iodine value, using the same catalyst repeatedly.

The oil, of course, is freshly supplied each time. For the first operation, it has the iodine value lowered to 59.4, to be discharged subsequently. On supplying fresh oil of the same quality for the second operation, the iodine was lowered to 38.5, which clearly shows that the catalytic power of the catalyst is successively elevated up to the fifth time. This shows how the same catalyst may be utilized practically more than thirty times.

The temperature is about 170–200° C. as in the known methods. As regards the time, voltage, etc., this has been explained in the amendment filed on June 3, 1936. The nickel is the common reduced nickel, preferably in the form of finely divided particles, which per se is not different from the ordinary hydrogenation of oil and is not peculiar, so it is understood by any chemist and therefore it has not been described in the original specification.

The quantity of a catalyzer used for the entire raw oil quantity is 0.024% as metallic nickel, and thus with such small quantity of a catalyzer as compared with the known methods it is possible to attain the object of hardening perfectly.

In short, according to this invention an excellent hydrogenating method hitherto unknown is obtained by employing a catalyzer in a suspending condition, utilizing both high tension alternate and direct electro-currents at the time of performing catalytic hydrogenation and thus effecting the separation and dispersion of the catalyzer simply in a reaction chamber.

The following are examples to indicate the amount of voltage, the area of electrodes, the size of the vessel and the reaction time, necessary to properly effect hydrogenation in accordance with the present invention:

In the manufacture of hardened soya bean oil, the electrode is spaced 50 cm. from the wall of the vessel and the electrical charge to be applied is 150 kv., and if the space between the electrode and the vessel is 5 cm., the charge will be 30 kv. The time required for hydrogenation when the product is to have an iodine value of 60, is 40 minutes. When the product is to have an iodine value of 10–20, the time is from 1½ to 2 hours. In the manufacture of aniline from nitrobenzene, the time required is 8 to 10 hours.

It is to be understood that the amount of voltage, the area of the electrodes, the size of the vessel and the reaction time, vary according to the class of the raw material used and the quality of the product desired.

We claim:

1. The method of hydrogenating fatty acid glycerides which comprises introducing a metal hydrogenation catalyst into a mass of said material, alternately subjecting the material having the catalyst to a high tension alternating current discharge and a high tension direct current discharge and adding fresh fatty acid glycerides after separating the metal catalyst from the treated material by the direct high tension electric discharge, and using the same metal catalyst repeatedly by keeping it from contact with the open air.

2. The method of hydrogenating fatty acid glycerides which comprises mixing with a charge of the material a nickel catalyzer, subjecting the material having the said catalyzer mixed therewith to the action of an alternating high tension electric discharge and immediately thereafter passing through the material a direct high tension electric discharge to separate the catalyst from the material on completion of the reaction, withdrawing the treated material after each application of high tension direct current discharge, and using the same catalyzer repeatedly by keeping it from contact with the open air.

IWAO SETO.
MASANORI SATO.